United States Patent [19]
Fiala

[11] 3,859,688
[45] Jan. 14, 1975

[54] APPARATUS FOR CLEANING CONCEALABLE LIGHTS

[75] Inventor: Ernst Fiala, Braunschweig-Querum, Germany

[73] Assignee: Volkswagenwerk Aktiengesellschaft, Wolfsburg, Germany

[22] Filed: Feb. 1, 1973

[21] Appl. No.: 328,501

[30] Foreign Application Priority Data
Feb. 26, 1972 Germany.............................. 2209122

[52] U.S. Cl............ 15/250.01, 15/250.1, 15/250 A, 240/7.1 H
[51] Int. Cl. .............................................. B60s 1/02
[58] Field of Search....... 15/250.01, 250.02, 250.03, 15/250.04, 250 A; 240/7.1 R, 7.1 H

[56] References Cited
UNITED STATES PATENTS
2,119,892   6/1938   Snow ............................ 240/7.1 H
3,708,822   1/1973   Buchwald ...................... 15/250.03

FOREIGN PATENTS OR APPLICATIONS
1,915,954   3/1969   Germany ......................... 15/250 A
1,075,737   7/1967   Great Britain ................. 240/7.1 H

*Primary Examiner*—Peter Feldman
*Attorney, Agent, or Firm*—Brumbaugh, Graves, Donohue & Raymond

[57] ABSTRACT

Apparatus for cleaning vehicle lights, particularly headlights, which may be concealed within the outer skin of the vehicle body includes wipers, washers, or advantageously, both wipers and washers which are operative to clean the lights upon the concealing or exposing movement. In a preferred embodiment, the cleaning apparatus is concealed within the outer skin of the vehicle. Also provided is a remotely-operated mechanism for enabling selective cleaning of the individual lights.

3 Claims, 4 Drawing Figures

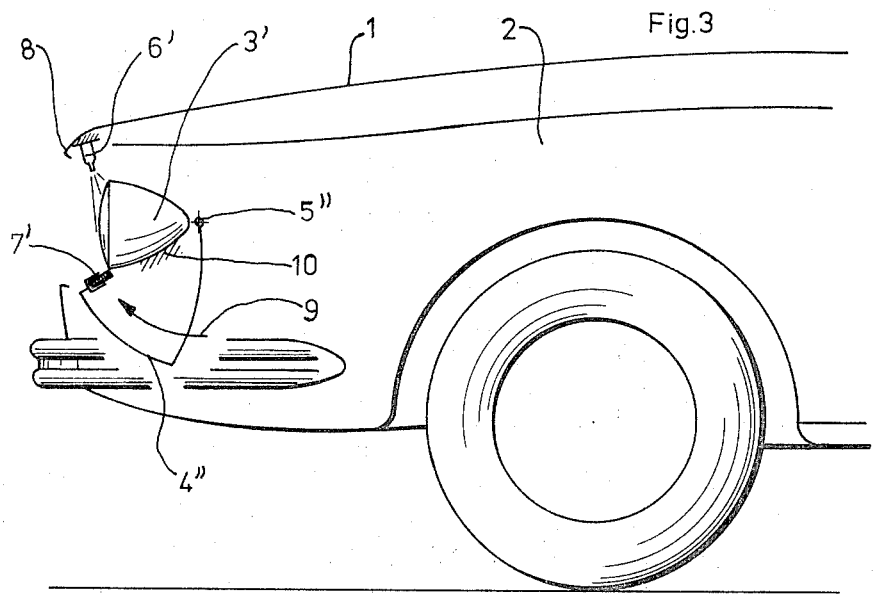
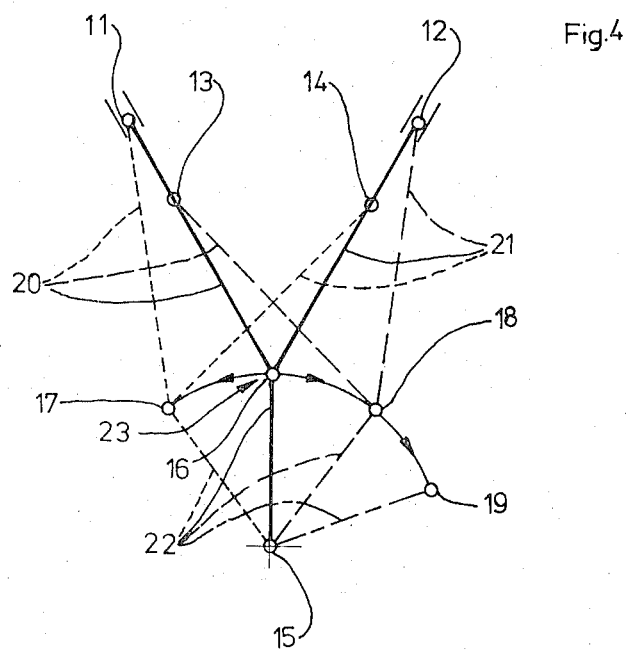

APPARATUS FOR CLEANING CONCEALABLE LIGHTS

BACKGROUND OF THE INVENTION

1. Field of the Invention

This invention relates in general to apparatus for cleaning vehicle lights, and particularly concerns simple and inexpensive apparatus for cleaning headlights of the concealable type which is contained within the outer skin of the vehicle body. The invention further relates to the cleaning of vehicle headlights in the interest of safety.

2. The Prior Art

As is well known, the illuminating power of vehicle lights may be greatly diminished by the accumulation of road dirt and grime as a result of bad road conditions. This problem has been aggravated in recent years by the widespread use during winter months of salt and other de-icing materials. These materials in addition to adding to normal road dirt are particularly troublesome inasmuch as they tend to become encrusted on the lights and are not washed off by rain.

An important factor in vehicle safety is the maintenance of the greatest possible illuminating power in vehicle lights. As it is not practical for a driver repeatedly to leave the vehicle, it has become desirable to provide automated cleaning devices on the lights which may be controlled from inside the vehicle. One such cleaning device is disclosed by German instrument of disclosure No. 1,815,098. Recently, for reasons of aerodynamics and style, there has been increased use of lights which can be concealed in the outer skin of the vehicle body, as described, for example, in German published patent application No. 1,580,487. Cleaning devices of the type proposed in German disclosure No. 1,815,098 are not suitable for use with concealable lights, however, as they are designed for fixed headlights only. Hence, other types of cleaning devices, of appropriate construction for use with concealable lights, are needed.

SUMMARY OF THE INVENTION

It is accordingly an object of the invention to provide apparatus for cleaning concealable headlights, which embodies a simplified and inexpensive construction without complicated transmission units.

This object, as well as other objects which will become apparent in the discussion that follows, is achieved, according to the present invention, by providing wipers, washers, or, preferably, both wipers and washers, within the outer skin of the vehicle and arranging the wipers and washers to act upon the lights as the concealing or exposing movement takes place. Where the lights are movable, e.g., of the kind in which the lights swivel between the concealed and exposed positions and conversely, the wipers and washers are preferably arranged in a stationary manner within the vehicle body. However, one or both may be movable, as, for example, when used with fixed lights that are concealed and exposed by moving a portion of the vehicle skin relative to the lights. In this instance, the wipers may conveniently be mounted on the movable skin portion or cover.

It is a feature of the invention that the above-described cleaning apparatus can be produced simply and economically, as the design eliminates the need for complicated transmission units to operate the wipers and washers.

In a further development of the invention, a remotely operable mechanism is provided for individual concealment or exposure of the lights. This is achieved by selective movement of the lights, the covers, or both the lights and the covers, as the case may be, and has the advantage of enabling the cleaning of one light while the other light continues to illuminate the road. As a result of this development, it is possible to continue driving during cleaning. In a preferred embodiment, the mechanism includes three arms, each joined to the others at one end at a common point. Two of the arms are coupled at their other ends to the lights, and the third is pivotable about its free end between selected positions at which, respectively, both lights are exposed, one light is concealed and the other exposed, the other light is exposed and the one concealed, and both lights are concealed.

By virtue of the above features and construction, the invention affords the advantage that no additional moving elements are required in existing systems. Cleaning is accomplished merely by the movement, typically swivelling, of the light or cover. Consequently, no complicated additional transmission mechanism is necessary. Also, by mounting the cleaning elements in a stationary manner, thin wiper arms may be avoided and substantial pressure can be exerted upon the light surface, so that a single sweeping movement suffices to clean a light in most cases.

BRIEF DESCRIPTION OF THE DRAWINGS

For a better understanding of the invention, reference may be made to the following description of exemplary embodiments thereof, taken in conjunction with the accompanying drawings, in which:

FIG. 3 diagramatically depicts a concealable headlight arrangement in which only the cover is swivelled; and FIG. 4 schematically illustrates a mechanical device for enabling individual cleaning of the headlights.

DESCRIPTION OF EXEMPLARY EMBODIMENTS

Figure 1:
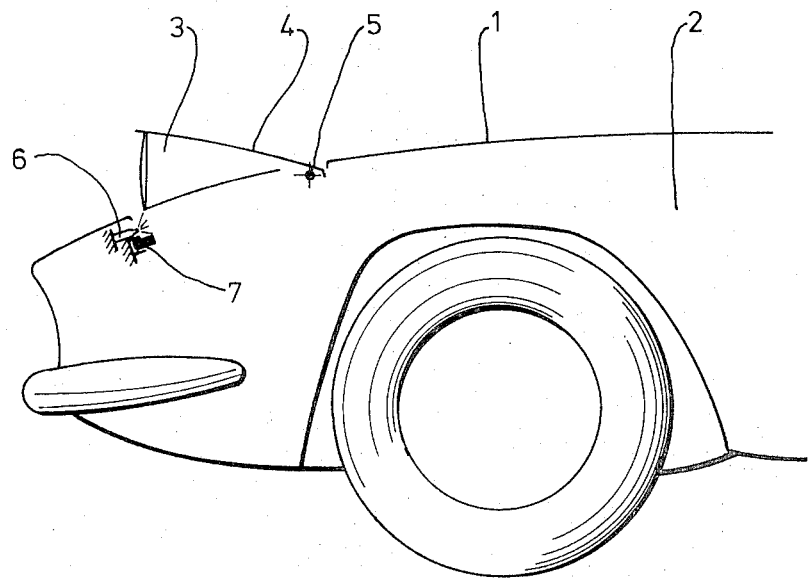
FIG. 1 is a diagramatic illustration of the front end of an automobile with headlights which swivel upward out of the outer skin of the vehicle.
Figure 2:
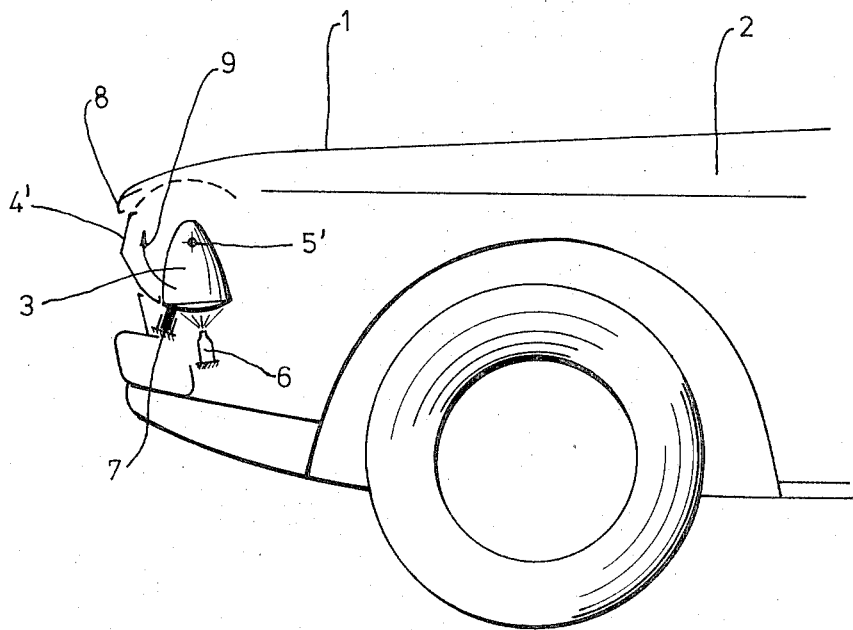
FIG. 2 is a diagramatic view of the front end of an automobile wherein both the headlights and the associated covers are swivelled simultaneously.

FIGS. 1, 2 and 3 illustrate conventional arrangements for concealing and exposing vehicle headlights. The swivelling mechanisms themselves for actually moving the lights or covers are not depicted in detail inasmuch as such mechanisms are well known.

In FIG. 1, the light 3 with cover 4 is swivelled around a fulcrum 5 to enable the retraction of light 3 into the outer skin 1 of a motor vehicle 2 whereby the cover 4 becomes flush with the outer skin 1. A nozzle 6 and wiper 7 are appropriately fixed to the body within the outer skin 1. As the light 3 is retracted, the nozzle 6 applies a suitable washing agent, e.g., water, against its surface. Continued movement of the light brings it into contact with the wiper 7 which wipes the surface clean.

In the FIG. 2 embodiment, the light 3 is swivelled around a point 5' located in the front portion 8 of the vehicle skin 1. A cover 4' is arranged on the light 3 and moves along with it, assuming the position indicated by the dotted line when the light is fully exposed. The arrow 9 indicates the direction of swivelling which results in exposure of the headlights. As in FIG. 1, both the cover and the light are swivelled. The washing nozzle 6 and the wiper 7 are appropriately fixed on the body within outer skin 1, as in FIG. 1. Here, the washing agent is applied when the light 3 is at the concealed position, and wiping takes place as the light swivels to the exposed position.

In FIG. 3, the light 3' is fixed to a body part 10, and the cover 4'' is pivotally supported at point 5''. The wiper 7' is carried by the cover 4''. The rinser 6' is fixed at a suitable location within the outer skin 1, e.g., just over the light 3'. When the cover 4'' is swivelled in the direction of arrow 9, the light 3' is wiped clean and covered.

FIG. 4 illustrates in schematic form one embodiment of a mechanism for selectively effecting the exposing and concealing movements of the lights, covers, or both and hence the cleaning of the lights. It enables the lights to be cleaned individually, so that one will always be available for illumination.

The mechanism includes three linkage members, or arms, 20, 21 and 22. One end of each arm is pivotally coupled to the others by a common joint 23. At their other ends, the arms 20 and 21 are each coupled to one of the lights at points 11 and 12, respectively. The nature of these couplings is such that the lights 3 and covers 4 (assuming for purposes of illustration the mounting arrangement of FIG. 1) are swivelled about the pivot points 5 upon movement of the coupling points 11 and 12 to the locations indicated at 13 and 14, respectively. As portrayed in FIG. 4, when the ends of arms 20 and 21 are at points 11 and 12, the lights are in the exposed positions; conversely, when they are at points 13 and 14, the lights are concealed. As further illustrated in FIG. 4, movement of the ends of arms 20 and 21 between points 11 and 13 and 12 and 14, respectively, is constrained to the planes passing through points 11 and 12 and point 23.

The free end of the arm 22 is mounted for pivotal movement about a point 15, which is located substantially equidistant between the two lights. Movement of the arm 22 may be carried out manually, e.g., through lever (not shown) coupled to the arm 22, or by means of a suitable servo-mechanism. Such servo-mechanisms are well known, and may, for example, be of the electrical, vacuum, or pressure-operated types.

In any event, the arm 22, and thus the exposing and concealing mechanism as a whole, is adapted to be moved to four operative positions. In the first of these positions, the joint 23 is at location 16, whereby the arms 20, 21 and 22 assume the configuration represented by the solid lines in FIG. 4. This, as noted, is the position at which both lights are exposed. When it is desired to clean the right-hand light, as viewed in FIG. 4, the arm 22 is pivoted until the joint 23 reaches position 17 and the arms 20, 21 and 22 reach the configuration shown by the dotted lines. This moves the outer end of arm 21 to point 14 and the associated light to the concealed position, thereby cleaning the light. The left-hand light, however, is not retracted, since the end of arm 20 stays substantially at point 11.

In a like manner, if the left-hand light is to be cleaned, the arm 22 is moved to the right of the plane containing the points 15 and 16 until the point 23 is at position 18. So positioned, the arms are arranged as shown by the dashed lines, and the left-hand light is concealed, and cleaned, upon movement of the end of arm 20 from point 11 to point 13. The right-hand light remains exposed.

After cleaning, either light may be readily restored to the exposed position simply by returning the arm 22 to the central location, i.e., so that joint 23 is at position 16.

As another feature of the invention, the mechanism of FIG. 4 includes a provision for moving both lights to the concealed position. This is accomplished by rotating the arm 23 beyond position 18 until the joint 23 is at position 19. Although for clarity the connection of arms 20 and 21 to the joint 23 is not shown in this position, it will be appreciated that both arm ends will be retracted from points 11 and 12 to points 13 and 14, respectively. To permit movement of the joint 23 to position 19, the arm 20 is given a telescoping or otherwise extensible construction which allows lengthening of the arm by the distance 18–19. Suitably, this construction includes a releasable catch, friction fit, or like connection, between the movable parts of the arm 20 to maintain the original length of the arm until the end moves at least as far as point 13 and thereafter to permit movement of the parts to allow lengthening of the arm.

Although the invention has been described with reference to specific embodiments thereof, many modifications and variations of such embodiments may be made by those skilled in the art without departing from the inventive concepts disclosed. Accordingly, all such modifications and variations are intended to be included within the spirit and scope of the appended claims.

I claim:

1. Apparatus for cleaning headlights which are mounted for concealment when not in use within the outer skin of a vehicle by movement either of a portion of the vehicle skin relative to each headlight or of the headlight relative to the vehicle skin between a first position in which the headlight is exposed and a second position in which the headlight is concealed, comprising:

means for cleaning the surface of each headlight upon movement of said vehicle skin portion or upon movement of the headlight, as the case may be, between said first and second positions; and means operable from a single point at the driver's position in the vehicle for (1) individually moving each vehicle skin portion or each headlight between said first and second positions whereby each headlight may be cleaned and returned to the exposed position while retaining the other headlight in the exposed position and (2) moving both vehicle skin portions or both headlights to the second position at the same time.

2. Apparatus for cleaning two spaced-apart lights which are mounted for concealment when not in use within the outer skin of a vehicle by movement either of a portion of the vehicle skin relative to each light or of each light relative to the vehicle skin between a first position in which the light is exposed and a second position in which the light is concealed, comprising:

at least one of means for applying a washing agent to the surface of each light and means for wiping the surface of each light upon movement of the light or of the related vehicle skin portion, as the case may be, between the concealed and exposed positions;

first linkage means operatively associated with one light for movement of the related vehicle skin portion or of said one light, as the case may be, between said concealed and exposed positions;

second linkage means of substantially the same length as the first linkage means operatively associated with the other light for movement of the related vehicle skin portion or of said other light, as the case may be, between the concealed and exposed positions;

third linkage means mounted at one end for pivotal movement about a point located substantially equidistant between the two lights and coupled at the other end to the adjacent ends of the first and second linkage means, the third linkage means being selectively pivotable about said point between first and second locations spaced substantially equidistantly on opposite sides of a plane passing through said pivot point and substantially equidistantly between the lights; and the first and second linkage means being coupled to the associated vehicle skin portion or light such that when the third linkage means is generally in alignment with said plane both lights are in the exposed position, when it is at said first location one of the lights is concealed and the other exposed, and when it is at the second location the other light is concealed and the one exposed.

3. Apparatus according to claim 1 wherein the third linkage means is pivotable to a third location spaced from said plane beyond the first location, at which third location of the third linkage means the first and second linkage means are operative to conceal both lights, the linkage means associated with the light located on the opposite side of said plane from the third location including means for permitting extension of the length thereof to accommodate movement of the third linkage means to the third location.

* * * * *

UNITED STATES PATENT OFFICE
CERTIFICATE OF CORRECTION

PATENT NO. : 3,859,688

DATED : January 14, 1975

INVENTOR(S) : Ernst Fiala

It is certified that error appears in the above-identified patent and that said Letters Patent are hereby corrected as shown below:

Column 3, line 40, "23" should be --16--;
Column 3, line 66, "point 23" should be --joint 23--;
Column 4, line 12, "arm 23" should be --arm 22--and
Column 6, line 9, "claim 1" should be --claim 2--.

Signed and sealed this 20th day of May 1975.

(SEAL)
Attest:

RUTH C. MASON
Attesting Officer

C. MARSHALL DANN
Commissioner of Patents
and Trademarks